United States Patent
Lindacher et al.

(10) Patent No.: US 8,684,520 B2
(45) Date of Patent: Apr. 1, 2014

(54) LENS DESIGN AND METHOD FOR PREVENTING OR SLOWING THE PROGRESSION OF MYOPIA

(75) Inventors: Joseph Michael Lindacher, Suwanee, GA (US); Ming Ye, Fort Worth, TX (US); Rick Edward Payor, Cumming, GA (US); Gregor F. Schmid, Cumming, GA (US)

(73) Assignee: Novartis AG, Basel (CH)

( * ) Notice: Subject to any disclaimer, the term of this patent is extended or adjusted under 35 U.S.C. 154(b) by 396 days.

(21) Appl. No.: 12/533,408

(22) Filed: Jul. 31, 2009

(65) Prior Publication Data

US 2010/0036489 A1 Feb. 11, 2010

Related U.S. Application Data

(60) Provisional application No. 61/087,795, filed on Aug. 11, 2008.

(51) Int. Cl.
*G02C 7/00* (2006.01)
*G02C 7/02* (2006.01)
*G02C 7/04* (2006.01)

(52) U.S. Cl.
USPC ............. 351/159.02; 351/159.52; 351/159.79

(58) Field of Classification Search
USPC ........ 351/160 R, 160 H, 177, 159.02, 159.33, 351/159.52, 159.79
See application file for complete search history.

(56) References Cited

U.S. PATENT DOCUMENTS

| | | |
|---|---|---|
| 4,155,626 A | 5/1979 | Grech |
| 4,573,775 A | 3/1986 | Bayshore |
| 4,958,924 A | 9/1990 | Parker |
| 5,030,231 A | 7/1991 | Portney |
| 5,121,980 A | 6/1992 | Cohen |
| 5,408,281 A | 4/1995 | Zhang |

(Continued)

FOREIGN PATENT DOCUMENTS

| | | |
|---|---|---|
| EP | 0745876 A2 | 12/1996 |
| WO | 9712272 A1 | 4/1997 |

(Continued)

OTHER PUBLICATIONS

Authors: David A. Atchison, Catherine E. Jones, Katrina L. Schmid, Nicola Pritchard, James M. Pope, Wendy E. Strugnell, and Robyn A. Riley Name of Article: Eye Shape in Emmetropia and Myopia Publisher in: Investigative Ophthalmology & Visual Science, Oct. 2004, vol. 45, No. 10, pp. 3380-3386 Copyright: © Association for Research in Vision and Ophthalmology.

(Continued)

*Primary Examiner* — Jordan Schwartz
(74) *Attorney, Agent, or Firm* — Robert Ambrose (57) ABSTRACT

A lens is provided that is capable of preventing or slowing the progression of myopia when worn by a person. The lens has a power profile that reduces on-axis and off-axis hyperopic defocus created by the optics of the eye by creating on-axis and off-axis myopic defocus. The on-axis and off-axis myopic defocus is created by providing light rays that pass through a central vision region of the optical portion and light rays that pass through a peripheral region of the optical portion an increase in positive (plus) power. The overall effect is to prevent or slow the progression of myopia without any perceptible degradation in the person's central vision.

15 Claims, 4 Drawing Sheets

(56) References Cited

U.S. PATENT DOCUMENTS

| | | | |
|---|---|---|---|
| 5,652,638 A | 7/1997 | Roffman | |
| 5,691,797 A | 11/1997 | Seidner | |
| 5,864,379 A | 1/1999 | Dunn | |
| 5,898,473 A | 4/1999 | Seidner | |
| 5,929,969 A | 7/1999 | Roffman | |
| 6,030,077 A | 2/2000 | Sawano | |
| 6,045,578 A | 4/2000 | Collins | |
| 6,176,579 B1 | 1/2001 | Mandell | |
| 6,260,966 B1 | 7/2001 | Sawano | |
| 6,286,956 B1 | 9/2001 | Oyama | |
| 6,343,861 B1 | 2/2002 | Kris | |
| 6,364,481 B1 | 4/2002 | O'Connor | |
| 6,364,483 B1 | 4/2002 | Grossinger | |
| 6,457,826 B1 | 10/2002 | Lett | |
| 6,474,814 B1 | 11/2002 | Griffin | |
| 6,540,353 B1 | 4/2003 | Dunn | |
| 6,695,449 B2 | 2/2004 | Ye | |
| 6,752,499 B2 | 6/2004 | Aller | |
| 6,874,887 B2 | 4/2005 | Tyson | |
| 7,025,460 B2 | 4/2006 | Smitth | |
| 7,036,931 B2 * | 5/2006 | Lindacher et al. | 351/161 |
| 7,040,757 B2 | 5/2006 | Hall | |
| 7,178,918 B2 | 2/2007 | Griffin | |
| 7,287,852 B2 | 10/2007 | Fiala | |
| 7,401,922 B2 | 7/2008 | Legerton | |
| 7,490,937 B2 | 2/2009 | Ye | |
| 7,503,655 B2 | 3/2009 | Smith | |
| 7,506,983 B2 | 3/2009 | To | |
| 7,637,612 B2 | 12/2009 | Menezes | |
| 7,665,842 B2 | 2/2010 | Ho | |
| 7,766,478 B2 | 8/2010 | Phillips | |
| 7,766,482 B2 | 8/2010 | Smith, III | |
| 7,803,153 B2 | 9/2010 | Thorn | |
| 7,832,859 B2 | 11/2010 | Phillips | |
| 7,862,171 B2 | 1/2011 | Varnas | |
| 7,909,465 B2 | 3/2011 | Ho | |
| 7,992,997 B2 | 8/2011 | Varnas | |
| 7,997,725 B2 | 8/2011 | Phillips | |
| 7,997,727 B2 | 8/2011 | Ho | |
| 8,192,020 B2 | 6/2012 | Goto | |
| 8,201,941 B2 | 6/2012 | Choo | |
| 8,240,847 B2 | 8/2012 | Holden | |
| 2003/0043342 A1 | 3/2003 | Seidner | |
| 2003/0058404 A1 | 3/2003 | Thorn | |
| 2003/0123024 A1* | 7/2003 | Dunn | 351/160 R |
| 2004/0201821 A1 | 10/2004 | Tyson | |
| 2004/0237971 A1 | 12/2004 | Radhakrishnan | |
| 2005/0041203 A1 | 2/2005 | Lindacher | |
| 2005/0105047 A1* | 5/2005 | Smitth et al. | 351/177 |
| 2006/0015180 A1 | 1/2006 | Peyman | |
| 2006/0082729 A1 | 4/2006 | To | |
| 2006/0176572 A1 | 8/2006 | Fiala | |
| 2007/0115431 A1 | 5/2007 | Smith, III | |
| 2007/0159601 A1 | 7/2007 | Ho | |
| 2007/0258143 A1 | 11/2007 | Portney | |
| 2007/0296916 A1 | 12/2007 | Holden | |
| 2008/0062380 A1 | 3/2008 | Phillips | |
| 2008/0084534 A1 | 4/2008 | Lindacher | |
| 2008/0212022 A1 | 9/2008 | Ye | |
| 2008/0218687 A1* | 9/2008 | Phillips | 351/161 |
| 2008/0309882 A1 | 12/2008 | Thorn | |
| 2009/0161065 A1 | 6/2009 | Smith | |
| 2009/0257026 A1 | 10/2009 | Varnas | |
| 2009/0303442 A1 | 12/2009 | Choo | |
| 2009/0310082 A1 | 12/2009 | Varnas | |
| 2010/0057202 A1 | 3/2010 | Bogaert | |
| 2010/0110371 A1 | 5/2010 | Ho | |
| 2010/0225883 A1 | 9/2010 | Ho | |
| 2010/0296050 A1 | 11/2010 | Goto | |
| 2010/0296058 A1 | 11/2010 | Ho | |
| 2011/0001923 A1 | 1/2011 | Phillips | |
| 2011/0032474 A1 | 2/2011 | Lindacher | |
| 2011/0037944 A1 | 2/2011 | Varnas | |

FOREIGN PATENT DOCUMENTS

| | | | |
|---|---|---|---|
| WO | WO 01/08605 A1 | 2/2001 | |
| WO | 0153878 A1 | 7/2001 | |
| WO | 02088831 A1 | 11/2002 | |
| WO | 2005055891 A1 | 6/2005 | |
| WO | 2006004440 A2 | 1/2006 | |
| WO | 2007041796 A1 | 4/2007 | |
| WO | 2007075975 A2 | 7/2007 | |
| WO | 2007082268 A2 | 7/2007 | |
| WO | 2007092853 A2 | 8/2007 | |
| WO | 2007146673 A2 | 12/2007 | |
| WO | 2008014544 A1 | 2/2008 | |
| WO | 2008031166 A1 | 3/2008 | |
| WO | 2008045847 A2 | 4/2008 | |
| WO | 2008116270 A1 | 10/2008 | |
| WO | 2008131479 A1 | 11/2008 | |
| WO | 2009129528 A1 | 10/2009 | |

OTHER PUBLICATIONS

Authors: Krish D. Singh, Nicola S. Logan, and Bernard Gilmartin Name of Article: Three-Dimensional Modeling of the Human Eye Based on Magnetic Resonance Imaging Publisher in: Investigative Ophthalmology & Visual Science, Jun. 2006, vol. 47, No. 6, pp. 2272-2279 Copyright: © Association for Research in Vision and Ophthalmology.

Authors: Donald O. Mutti, Robert I. Sholtz, Nina E. Friedman, and Karla Zadnik Name of Article: Peripheral Refraction and Ocular Shape in Children Publisher in: Investigative Ophthalmology & Visual Science, Apr. 2000, vol. 41, No. 5, pp. 1022-1030 Copyright: © Association for Research in Vision and Ophthalmology.

PCT International Search Report dated Feb. 4, 2010.

PCT Written Opinion of the International Searching Authority dated Feb. 4, 2010.

David R. Williams et al., "Off-axis Optical Quality and Retinal Sampling in the Human Eye", Vision Research, Pergamon Press, Oxford, Great Britain, vol. 36, No. 8, Apr. 1, 1996, pp. 1103-1114.

* cited by examiner

LENS DESIGN AND METHOD FOR PREVENTING OR SLOWING THE PROGRESSION OF MYOPIA

This application claims the benefit under 35 USC 119(e) of the U.S. Provisional Patent Application No. 61/087,795 filed Aug. 11, 2008, incorporated herein by reference in its entirety.

TECHNICAL FIELD OF THE INVENTION

The invention relates to contact lenses. More particularly, the invention relates to a contact lens design and method intended to reduce the progression of myopia by providing myopic refractive stimulus in the retina of the eye of the contact lens wearer.

BACKGROUND OF THE INVENTION

A contact lens is a thin lens made of an optically transparent material such as plastic or glass that is fitted over the cornea of the eye to correct vision defects. Various types of contact lenses exist that are designed to treat various types of vision defects such as myopia, hyperopia, presbyopia or astigmatism, and combinations of these defects. Contact lens types can be further divided into "rigid" contact lenses, which rest on the cornea of the eye, and "soft" contact lenses, which rest on the cornea and surrounding sclera of the eye.

Typical contact lenses have a central portion, which is the optical portion of the lens, and a peripheral portion, which is the carrier portion of the lens. The carrier portion typically contains a transition, or blending, zone where the optical portion and the carrier portion meet. The optical portion typically extends from the center of the lens outwardly to a distance of approximately 3.5 to 4 millimeters (mm) where the optical portion meets the carrier portion. This corresponds to a sagittal radius, r, that ranges from r=0.0 mm at the center of the lens to r≈3.5 or 4.0 mm at the boundary where the optical and carrier portions of the lens meet. The carrier portion of a typical contact lens starts where the optical portion ends (e.g., at r≈3.5 or 4.0 mm) and extends outwardly a radial distance from the lens center of r≈7.0. Thus, the typical contact lens has a total diameter of approximately 14.0 mm.

In typical contact lens designs, the optical portion of the lens provides optical power for vision correction. The carrier portion of the lens serves to stabilize the lens and fit the lens comfortably over the cornea and/or limbus of the eye, but normally is not designed to provide vision correction. It is generally accepted that central vision is more accurate than peripheral vision. The highest concentration of photoreceptors is in a small depression near the center of the retina known as the fovea centralis. The fovea centralis is about 0.2 mm in diameter, representing about 20 minutes of angle on either side of the visual axis of the eye. Acuity drops dramatically in the peripheral region of the retina such that at about 5 degrees off of the visual axis, the acuity has dropped to about ⅓ of the central value.

While contact lenses typically are not designed to provide optical control over peripheral vision, it has been suggested that the peripheral retina may have important effects on the emmetropization system that controls the growth of the eye. For example, it has been suggested that blur and defocus in the peripheral retina have an effect on the axial eye growth and play a role in the development of refractive errors such as myopia. Myopia is the medical term for nearsightedness. Myopia results from excessive growth of the eyeball along its longitudinal axis. Individuals with myopia see objects that are closer to the eye more clearly, while more distant objects appear blurred or fuzzy. These individuals are unable to see distant objects clearly without a correction lens. Because excessive axial growth of the eyeball typically continues throughout childhood and adolescence, the condition of nearsightedness usually worsens over time. Myopia has become one of the most prevalent vision problems. Furthermore, myopic individuals tend to be predisposed to a number of serious ocular disorders, such as retinal detachment or glaucoma, for example. Presumably, this is because of the anatomical distortions that exist in the enlarged myopic eye. Extreme cases of these disorders are among the leading causes of blindness.

It is generally accepted that myopia is caused by a combination of an individual's genetic factors and environmental factors. Multiple complex genetic factors are associated with the development of refractive error. Currently, no genetic treatment approach exists for preventing or slowing the progression of myopia. Researchers have proposed that accommodative lag at near vision provides hyperopic defocus stimulus that leads to excessive axial eye growth, and thus to the development of myopia. It has been proposed that the use of a lens that provides on-axis myopic defocus can remove the on-axis hyperopic defocus that leads to excessive eye growth. For example, researchers have shown that myopic children who wore progressive addition lenses (PALs) exhibited reduced myopia progression over three years as compared to an age-matched and refraction-matched population of children who wore single vision lenses over an equal time period. The PALs create on-axis myopic defocus. It is presumed that the on-axis myopic defocus provided by the PALs removes the on-axis hyperopic defocus created by the optics, resulting in a reduction in myopia progression.

It has also been proposed that peripheral hyperopic defocus may stimulate axial eye growth, thereby leading to the progression of myopia. The optical treatment system that has been proposed to counter this effect comprises a lens that is designed to remove hyperopic defocus by creating a myopic shift in refraction peripherally (i.e., off-axis), while providing no central (i.e., on-axis) effect. To performs these functions, the lens is provided with: (1) on-axis optics that are optimized for central refraction such that any central (on-axis) retinal defocus created by the optics of the eye is minimized to provide the best possible central visual acuity; and (2) off-axis optics that are tailored to provide peripheral (off-axis) myopic defocus that corrects for the peripheral (off-axis) hyperopic defocus. Therefore, this approach is intended to only remove peripheral (off-axis) hyperopic defocus created by the optics of the eye and is not intended to have any effect on central (on-axis) hyperopic defocus created by the optics of the eye.

While this approach may be suitable for individuals who are at relatively advanced stages of myopia, it may not suitable for individuals who are only slightly myopic or who are in early stages of myopia. In individuals who are only slightly myopic or who are in early stages of myopia, little or no peripheral hyperopia exists when considering refractive status for near vision (i.e., for close visual work). In these cases, the peripheral myopic defocus is excessive and can produce peripheral hyperopic stimulus, which may actually speed up the progression of myopia. Therefore, in such cases, using a lens that creates peripheral myopic defocus is not an adequate solution for preventing or slowing the progression of myopia.

Accordingly, a need exists for a lens design and method that are effective at preventing or slowing the progression of myopia.

SUMMARY OF THE INVENTION

A lens and method are provided for preventing myopia or slowing the progression of myopia. The lens comprises at least an optical portion and a carrier portion. The optical portion extends outwardly from the center of the lens to an outer periphery of the optical portion. The carrier portion of the lens is connected to the outer periphery of the optical portion by a blending zone of the carrier portion. The carrier portion extends outwardly from the outer periphery of the optical portion to an outer periphery of the carrier portion. The lens has a power profile that creates on-axis and off-axis myopic defocus to reduce on-axis and off-axis hyperopic defocus created by the optics of the eye. The on-axis and off-axis myopic defocus is created by providing an increase in positive (plus) power for central and peripheral light rays that pass through the central vision and peripheral regions, respectively, of the optical portion of the lens.

In accordance with another embodiment, the lens comprises at least an optical portion and a carrier portion. The optical portion extends outwardly from the center of the lens to an outer periphery of the optical portion. The carrier portion of the lens is connected to the outer periphery of the optical portion by a blending zone of the carrier portion. The carrier portion extends outwardly from the outer periphery of the optical portion to an outer periphery of the carrier portion. The lens has a power profile that is defined by a compound mathematical function. The compound mathematical function that defines the profile results in on-axis and off-axis myopic defocus being created that operates to reduce on-axis and off-axis hyperopic defocus created by the optics of the eye. The profile creates the on-axis and off-axis myopic defocus by providing an increase in positive (plus) power for central and peripheral light rays that pass through the central vision and peripheral regions, respectively, of the optical portion of the lens.

The method comprises selecting a first mathematical function for use in defining a first part of a power profile for a lens, selecting a second mathematical function for use in defining a second part of the power profile for the lens, and combining the first and second mathematical functions to produce a compound function. The compound mathematical function that defines the profile results in on-axis and off-axis myopic defocus being created that operates to reduce on-axis and off-axis hyperopic defocus created by the optics of the eye. The profile creates the on-axis and off-axis myopic defocus by providing an increase in positive (plus) power for central and peripheral light rays that pass through the central vision and peripheral regions, respectively, of the optical portion of the lens.

These and other features and advantages of the invention will become apparent from the following description, drawings and claims.

DETAILED DESCRIPTION OF AN ILLUSTRATIVE EMBODIMENT

In accordance with the invention, a lens is provided that creates on-axis and off-axis myopic defocus to reduce on-axis and off-axis hyperopic defocus by in the eye of the wearer. Using on-axis and off-axis myopic defocus to reduce on-axis and off-axis hyperopic defocus has the effect of preventing, or at least slowing, excessive growth of the eyeball along the longitudinal axis. In addition, although the lens creates on-axis myopic defocus, the lens does not result in any perceptible degradation in the quality of the wearer's central vision.

In accordance with the invention, experiments were conducted using three categories of lenses: (1) known lens designs that provide only on-axis myopic defocus; (2) known lens designs that provide only off-axis myopic defocus; and (3) lenses designed in accordance with the invention to provide both on-axis and off-axis myopic defocus. One of the purposes of the experiments was to determine how much greater the degradation in central vision is in individuals who wore lenses of category (3) than it would be in individuals who wore lenses of categories (1) and (2). Another purpose of the experiments was to determine how effective the category (3) lenses are at preventing or slowing the progression of myopia.

It was expected that the lenses of category (3) would create significantly more degradation in central vision than that created by the lenses of categories (1) and (2). This is the primary reason that attempts to prevent or slow the progression of myopia have, until now, been limited to using category (1) or category (2) lenses. Unexpectedly, however, the results of the experiments demonstrated that the category (3) lenses provide no perceptible degradation in central vision. As expected, the results of the experiments demonstrated that the category (3) lenses are effective at preventing or slowing the progression of myopia.

The term "on-axis", as that term is used herein, is intended to refer to locations that are along the longitudinal, visual axis of the eyeball. The term "off-axis", as that term is used herein, is intended to refer to locations that are not along the longitudinal, visual axis of the eyeball. The term "myopic defocus", as that term is used herein, is intended to mean any refractive state where the image of a distant object is formed in front of the retina. The term "off-axis myopic defocus" is intended to mean myopic defocus provided by the lens that is not on the longitudinal, visual axis of the eyeball. The term "off-axis myopic defocus" is used interchangeably herein with the term "peripheral myopic defocus". The term "on-axis myopic defocus" is intended to mean myopic defocus provided by the lens that is on the longitudinal, visual axis of the eyeball. The term "off-axis myopic defocus" is used interchangeably herein with the term "central myopic defocus".

The term "hyperopic defocus", as that term is used herein, is intended to mean any refractive state where the image of a distant object is formed behind of the retina. The term "off-axis hyperopic defocus", as that term is used herein, is intended to mean hyperopic defocus provided by the lens that is not on the longitudinal, visual axis of the eyeball. The term "off-axis hyperopic defocus" is used interchangeably herein with the term "peripheral hyperopic defocus". The term "on-axis hyperopic defocus" is intended to mean hyperopic defocus provided by the lens that is on the longitudinal, visual axis of the eyeball. The term "on-axis hyperopic defocus" is used interchangeably herein with the term "central hyperopic defocus".

Figure 1:
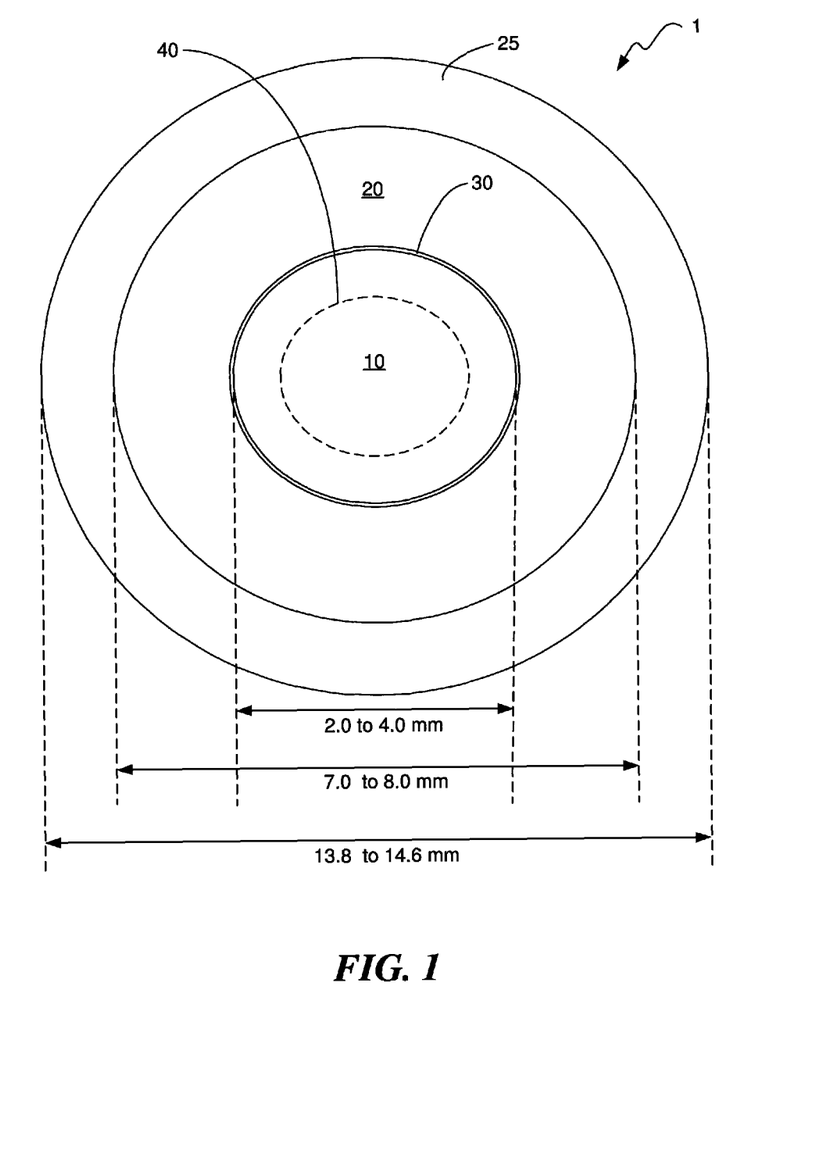
FIG. 1 illustrates a plan view of a contact lens 1 in accordance with an embodiment for preventing or slowing the progression of myopia.

FIG. 1 illustrates a plan view of a contact lens 1 in accordance with an embodiment for preventing myopia or slowing the progression of myopia. The lens 1 comprises an optical portion 10 and a carrier portion 20. The carrier portion 20 includes a blending portion 30 that interconnects the optical portion 10 and the carrier portion 20. The optical portion 10 has a radius, r, which typically ranges from 0.0 mm at the center 2 of the lens 1 to about 3.5 or 4.0 mm at the outer edge of the periphery 3 of the optical portion 10. The carrier portion 20 has an inner radius, $r_I$, that coincides with the radius, r, of the optical portion 10, and an outer radius, $r_O$, that coincides with the outer edge of the periphery 11 of the carrier portion 20 and is typically about 7.0 mm to about 8.0 mm.

The optical portion 10 comprises a central vision region and a peripheral region. The central vision region is located in the center portion of the optical portion 10 represented by dashed circle 40. The peripheral region of the optical portion 10 is located between the central vision region and the interface where the optical portion 10 meets the blending portion 30. The on-axis myopic defocus is created by the central vision region of the optical portion 10, which provides a positive (plus) power for central light rays passing through it. Central light rays that pass through the central vision region of the optical portion 10 are typically referred to as paraxial rays, which are generally coaxial with the longitudinal, visual axis of the eyeball. The off-axis myopic defocus is created by the peripheral region of the optical portion 10 of the lens, which also provides a positive (plus) power for peripheral light rays passing through it.

Although the lens 1 provides both on-axis and off-axis myopic defocus, as indicated above, it has been determined through experimentation that this does not perceptibly degrade the individual's central vision. As also indicated above, the on-axis and off-axis myopic defocus provided by the lens prevents or slows the progression of excessive eye growth. These achievements are made possible through the use of a lens having a power profile that is defined either by a combination of multiple error functions or by a combination of at least one error function and at least one other function that is not an error function, as will now be described in detail with reference to FIGS. 2 and 3.

Figure 2:
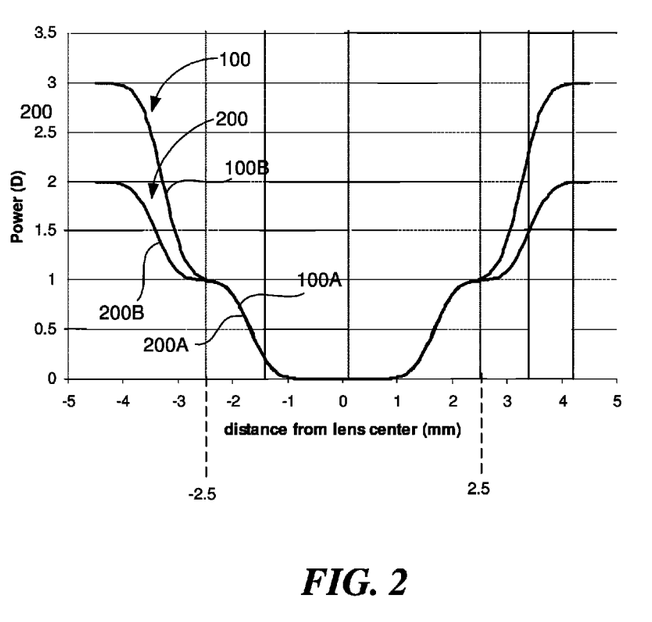
FIG. 2 illustrates two different power profiles that are suitable for the lens shown in FIG. 1 for removing on-axis and off-axis hyperopic stimulus to prevent or at least slow the progression of myopia.

FIG. 2 illustrates two different power profiles 100 and 200 that are suitable for the lens 1 shown in FIG. 1. The lens 1 may be designed to have power profiles other than those shown in FIG. 2. The profiles 100 and 200 shown in FIG. 2 are merely examples of suitable power profiles that enable the goals of the invention to be achieved. Those of ordinary skill in the art will understand, in view of the description provided herein, how other power profiles may be designed that achieve the goals of the invention. The horizontal axis corresponds to the radial distance, in millimeters, from the center of the lens 1. The vertical axis corresponds to the optical power, in diopters, provided by the lens 1 as a function of distance from the center of the lens 1. The profiles 100 and 200 are both radially symmetric about a point that is at or very near the center of the lens 1. Therefore, only the left portions of the profiles 100 and 200 relative to the drawing sheet containing FIG. 2 will be described.

Referring first to profile 100, it comprises first and second parts, 100A and 100B, respectively, of an error function, (Erf(x)). The first and second parts 100A and 100B meet at a radius, or semi-diameter, of about 2.5 mm from the center of the lens 1. The first part 100A of power profile 100 has distance vision optical power (e.g., 0 diopters) from the center of the lens 1 out to a radius of about 1.0 mm from the center of the lens 1, and then gradually ramps up to an optical power of about 1.0 diopters at a radius of about 2.5 mm from the center of the lens 1. The second part 100B of the profile 100 has an optical power of about 1.0 diopters at a radius of about 2.5 mm from the lens center and then gradually ramps up to an optical power of about 3.0 diopters at a radius of about 4.0 mm from the lens center.

With respect to profile 200, like profile 100, it comprises first and second parts 200A and 200B, respectively, of an error function, (Erf(x)). The first and second parts 200A and 200B meet at a radius of about 2.5 mm from the center of the lens 1. The first part 200A of power profile 200 has distance vision power (e.g., 0 diopters) from the lens center out to a radius of about 1.0 mm and then gradually ramps up to an optical power of about 1.0 diopters at a radius of about 2.5 mm from the lens center. The second part 200B of the profile 200 has an optical power of about 1.0 diopters at a radius of about 2.5 mm from the lens center and then gradually ramps up to an optical power of about 2.0 diopters at a radius of about 4.0 mm.

The average pupil size for children is about 5.0 mm in diameter, which typically corresponds to the diameter of the central vision region of the optical portion 10 of the lens 1. Therefore, the profiles 100 and 200 are designed so that the ramp up in optical power from about 1.0 diopters to about 3.0 diopters for profile 100, or from about 1.0 diopters to about 2.0 diopters for profile 200, occurs outside of the central vision region of the optical portion 10 of the lens 1. In other words, this ramp up occurs in the peripheral region of the optical portion 10.

The relatively low positive (plus) power provided in the central vision region of the optical portion 10 results in most, if not all, on-axis hyperopic defocus being removed. This reduces or removes on-axis hyperopic stimulus, which helps in preventing or slowing the progression of myopia. In addition, the low positive (plus) power provided in the central vision region reduces near vision stress and increases depth of focus for central vision. Therefore, the individual experiences no perceptible degradation in central vision. The higher positive (plus) power provided in the peripheral region of the optical portion 10 results in most, if not all, off-axis hyperopic defocus being removed. In addition, the higher positive (plus) power provided in the peripheral region of the optical portion 10 results in an overall increase in off-axis myopic stimulus, which has the effect of preventing eye growth or at least slowing the progression of eye growth.

Figure 3:
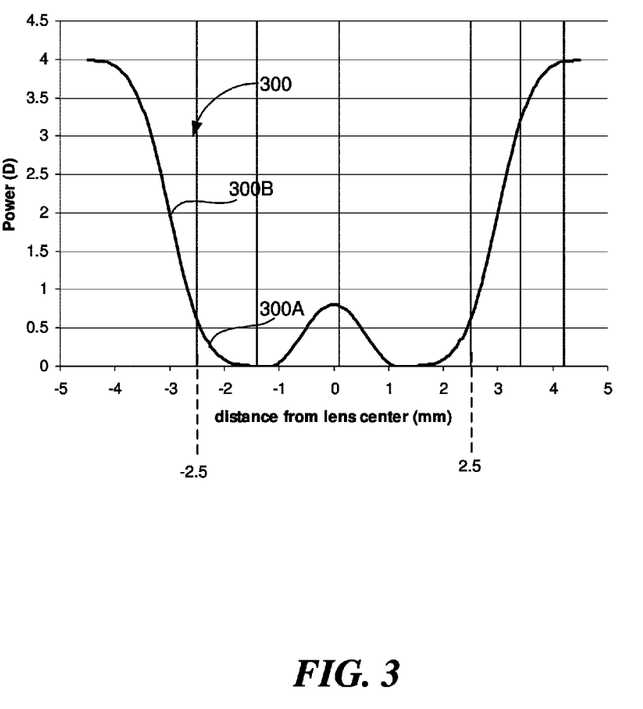
FIG. 3 illustrates another example of a power profile that is suitable for the lens shown in FIG. 1 for removing on- and off-axis hyperopic stimulus to prevent or slow the progression of myopia.

FIG. 3 illustrates an example of another power profile 300 that is suitable for use with the invention. Like profiles 100 and 200 shown in FIG. 2, profile 300 is rotationally symmetric about a point that is at or very near the center of the lens 1. The profile 300 comprises first and second parts 300A and 300B, respectively, which meet at a radius of about 2.5 mm from the center of the lens 1. The first part 300A corresponds to a cosine function and the second part 300B corresponds to an error function (Erf (x)). The first part 300A has an optical power corresponding to about 0.8 diopters at the center of the lens 1 and then decreases gradually to distance vision power (e.g., 0 diopters) at a distance of about 1.5 mm from the lens center. The first part 300A remains at distance vision power until about a 2.0 mm radius from the lens center and then gradually ramps up to an optical power of about 4.0 diopters at a radius of about 2.25 mm.

The cosine function corresponding to part 300A of the profile 300 provides a relatively low positive (plus) power at the center of the lens 1, which results in more hyperopic stimulus than that provided by either of profiles 100 or 200, without perceptibly degrading the quality of the wearer's central vision. The error function corresponding to part 300B of the profile 300 provides a gradual ramp up in positive (plus) power that is greater than that provided by either of profiles 100 or 200. This ramp up occurs in the peripheral region of the optical portion 10 of the lens 1. The profile 300 provides more dominate hyperopic stimulus than that provided by the profiles 100 and 200 shown in FIG. 2 due to the larger area over which positive (plus) power is provided by the profile 300. For this reason, the profile 300 will result in a better anti-myopia effect for some wearers.

As with the profiles 100 and 200 described above with reference to FIG. 2, the profile 300 shown in FIG. 3 provides a relatively low positive (plus) power in the central vision region of the optical portion 10 that results in most, if not all, on-axis hyperopic defocus being removed. This reduces on-axis hyperopic stimulus, which results in the progression of myopia being prevented or slowed. In addition, the low positive (plus) power provided in the central vision region has the effect of preventing near vision stress and increasing depth of focus for central vision. Therefore, the individual experiences no perceptible degradation in central vision. The profile 300 provides a higher positive (plus) power in the peripheral region of the optical portion 10, which results in most, if not all, off-axis hyperopic defocus being removed. In addition, the higher positive (plus) power provided in the peripheral region of the optical portion 10 results in an increase in off-axis myopic stimulus, which has the effect of preventing eye growth or at least slowing the progression of eye growth.

The power profile of the lens 1 is not limited to the profiles 100, 200 and 300. The profile of the lens 1 may also be defined as follows in terms of an increase in positive (plus) power as a function of radial distance from the center of the lens 1. In accordance with an embodiment in which the profile is defined by multiple error functions, as described above with reference to FIG. 2, the profile has a first increase in positive (plus) power that ranges from a minimum first positive (plus) power of about 0.5 diopters to a maximum first positive (plus) power of about 1.5 diopters over a radial distance from the lens center ranging from a first radial distance of about 1.5 mm to a second radial distance of about 3.0 mm. The profile has a second minimum increase in positive (plus) power that is equal to the first maximum positive (plus) power at the second radial distance and a second maximum positive (plus) power that is at least 0.5 diopters greater than the first maximum positive (plus) power at a third radial distance that is at least 0.5 mm greater than the second radial distance.

In the case in which the power profile is defined by an error function and at least one other function (e.g., a cosine function), as in the case described above with reference to FIG. 3, the power profile of the lens 1 is not limited to the profile 300, and can be defined as follows in terms of increase in positive (plus) power as a function of radial distance from the center of the lens 1. The profile has a first increase in positive (plus) power that ranges from a maximum first positive (plus) power of about 1.5 diopters at a location corresponding substantially to the lens center to a minimum first positive (plus) power of about 0 diopters at a radial distance from the lens center ranging from a first radial distance of about 1.0 mm to a second radial distance of about 2.0 mm. The profile has a second increase in positive (plus) power that ranges from a second minimum positive (plus) power that is equal to the first minimum positive (plus) power at the second radial distance and a second maximum positive (plus) power that is equal to or greater than about 2.0 diopters at a third radial distance that is equal to or greater than about 2.0 mm.

Figure 4:
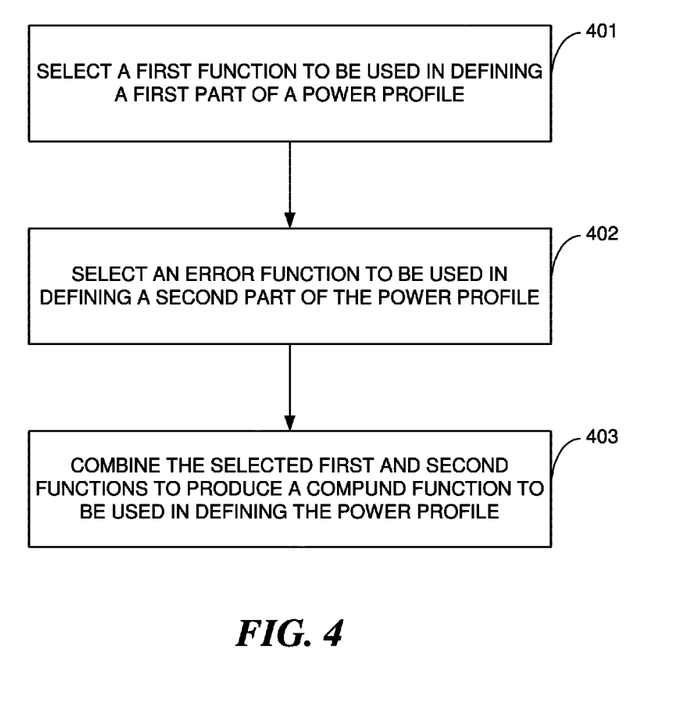
FIG. 4 illustrates a flowchart that represents the method in accordance with an embodiment for designing a lens that prevents or slows the progression of myopia.

FIG. 4 illustrates a flowchart that represents the method in accordance with an embodiment for designing a lens that prevents, or at least slows, the progression of myopia. A first function is selected to define a first part of a power profile that will be used for the lens, as indicated by block 401. This function will be an error function or some other function, such as a cosine function. A second function is selected to define a second part of the power profile that will be used for the lens, as indicated by block 402. This function will be an error function. The first and second functions are combined to produce a compound function, as indicated by block 403. The order in which the processes represented by blocks 401-403 are performed may be different from the order depicted in FIG. 4, and certain processes (e.g., blocks 401 and 402) may be performed as part of a single process.

The values for the terms that are used in the functions may be determined during the selection processes or after the functions have been combined to produce the compound function. Typically, after the power profile has been obtained by the method described above with reference to FIG. 4, computer simulations are performed in software and adjustments may be made to the values of the terms of the compound function. Once the final power profile has been obtained, a contact lens having the profile may be manufactured by any of a variety of techniques, such as, for example, injection molding, polishing, etc. The invention is not limited with respect to the technique that is used to manufacture the lens or with respect to the material of which the lens is made. For example, the lens may be a soft contact lens made of a plastic material or a hard contact lens made of a rigid material such as glass.

It should be noted that the invention has been described with reference to a few illustrative embodiments for the purpose of demonstrating the principles and concepts of the invention. However, the invention is not limited to the embodiments described herein. As will be understood by those of ordinary skill in the art in view of the description provided herein, many modifications may be made to the embodiments described herein without deviating from the scope of the invention.

What is claimed is:

1. A lens for preventing myopia or reducing the progression of myopia, the lens comprising:

an optical portion extending outwardly from a lens center to an outer periphery of the optical portion, the optical portion having a central vision region and a peripheral region; and a carrier portion connected to the outer periphery of the optical portion by a blending zone of the carrier portion, the carrier portion extending outwardly from the outer periphery of the optical portion to an outer periphery of the carrier portion, and wherein the lens has a power profile extending outwardly from the lens center that creates on-axis and off-axis myopic defocus to reduce or remove on-axis and off-axis hyperopic defocus created by optics in the eye of a person wearing the lens, the profile creating the on-axis and off-axis myopic defocus by providing an increase in positive (plus) power for light rays passing through the central vision and peripheral regions of the optical portion; and wherein the power profile has a first increase in positive (plus) power that ranges from a minimum first positive (plus) power of about 0.5 diopters to a maximum first positive (plus) power of about 1.5 diopters over a radial distance from the lens center ranging from a first radial distance of about 1.5 mm to a second radial distance of about 3.0 mm, and wherein the power profile has a second minimum increase in positive (plus) power that is equal to the first maximum positive (plus) power at the second radial distance and has a second maximum increase in positive (plus) power that is at least 0.5 diopters greater than the first maximum positive (plus) power at a third radial distance, wherein the third radial distance is at least 0.5 mm greater than the second radial distance.

2. The lens of claim 1, wherein the power profile is defined by a compound mathematical function comprising at least first and second error functions.

3. The lens of claim 1, wherein the increase in positive (plus) power provided for light rays passing through the central vision region of the optical portion is less than the increase in positive (plus) power provided for light rays passing through the peripheral region of the optical portion.

4. The lens of claim 1, wherein the power profile is defined by a compound mathematical function comprising at least first and second functions, the first function being an error function, the second function being a function other than an error function.

5. The lens of claim 4, wherein the second function is a cosine function.

6. A lens for preventing myopia or reducing the progression of myopia, the lens comprising:
    a optical portion extending outwardly from a lens center to an outer periphery of the optical portion, the optical portion having a central vision region and a peripheral region; and
    a carrier portion connected to the outer periphery of the optical portion by a blending zone of the carrier portion, the carrier portion extending outwardly from the outer periphery of the optical portion to an outer periphery of the carrier portion, and wherein the lens has a power profile extending outwardly from the lens center that is defined by a compound mathematical function, and wherein the profile defined by the compound mathematical function is designed to create on-axis and off-axis myopic defocus for reducing or removing on-axis and off-axis hyperopic defocus created by optics of an eye, and wherein the profile creates the on-axis and off-axis myopic defocus by providing an increase in positive (plus) power for light rays passing through the central vision and peripheral regions of the optical portion; and
    wherein the power profile has a first increase in positive (plus) power that ranges from a minimum first positive (plus) power of about 0.5 diopters to a maximum first positive (plus) power of about 1.5 diopters over a radial distance from the lens center ranging from a first radial distance of about 1.5 mm to a second radial distance of about 3.0 mm, and wherein the power profile has a second minimum increase in positive (plus) power that is equal to the first maximum positive (plus) power at the second radial distance and has a second maximum increase in positive (plus) power that is at least 0.5 diopters greater than the first maximum positive (plus) power at a third radial distance, wherein the third radial distance is at least 0.5 mm greater than the second radial distance.

7. The lens of claim 6, wherein the compound mathematical function comprises first and second functions and wherein the first and second functions are first and second error functions, respectively.

8. The lens of claim 6, wherein the compound mathematical function comprises first and second functions and wherein the first function is an error function and the second function is a function other than an error function.

9. The lens of claim 8 wherein the second function is a cosine function.

10. The lens of claim 6 wherein the increase in positive (plus) power provided for light rays passing through the central vision region of the optical portion is less than the increase in positive (plus) power provided for light rays passing through the peripheral region of the optical portion.

11. A method for preventing or slowing the progression of myopia using a lens, the method comprising:
    selecting a first mathematical function for use in defining a first part of a power profile for the lens;
    selecting a second mathematical function for use in defining a second part of the power profile for the lens; and
    combining the first and second mathematical functions to produce a compound function, wherein the profile defined by the compound mathematical function is designed to create on-axis and off-axis myopic defocus for reducing or removing on-axis and off-axis hyperopic defocus created by optics of an eye, and wherein the profile creates the on-axis and off-axis defocus by providing an increase in positive (plus) power for light rays passing through the central vision and peripheral regions of the optical portion; and
    wherein the power profile has a first increase in positive (plus) power that ranges from a minimum first positive (plus) power of about 0.5 diopters to a maximum first positive (plus) power of about 1.5 diopters over a radial distance from the lens center ranging from a first radial distance of about 1.5 mm to a second radial distance of about 3.0 mm, and wherein the power profile has a second minimum increase in positive (plus) power that is equal to the first maximum positive (plus) power at the second radial distance and has a second maximum increase in positive (plus) power that is at least 0.5 diopters greater than the first maximum positive (plus) power at a third radial distance, wherein the third radial distance is at least 0.5 mm greater than the second radial distance.

12. The method of claim 11, wherein at least one of the first and second mathematical functions selected during the selecting steps is an error function.

13. The method of claim 12, wherein the first and second mathematical functions selected during the selecting steps are first and second respective error functions.

14. The method of claim 11, wherein one of the first and second mathematical functions selected during the selecting steps is an error function and wherein one of the first and second mathematical functions selected during the selecting steps is a cosine function.

15. The method of claim 11, wherein the increase in positive (plus) power provided for light rays passing through the central vision region of the optical portion is less than the increase in positive (plus) power provided for light rays passing through the peripheral region of the optical portion.

* * * * *